(12) United States Patent
Boettcher et al.

(10) Patent No.: US 11,073,959 B2
(45) Date of Patent: Jul. 27, 2021

(54) SIMULATING PHYSICAL MATERIALS AND LIGHT INTERACTION IN A USER INTERFACE OF A RESOURCE-CONSTRAINED DEVICE

(75) Inventors: Jesse William Boettcher, San Jose, CA (US); Michael I. Ingrassia, Jr., San Jose, CA (US); James Eric Mason, Campbell, CA (US); Anton M. Davydov, Gilroy, CA (US); David J. Rempel, San Jose, CA (US); Imran Chaudhri, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 494 days.

(21) Appl. No.: 13/609,102

(22) Filed: Sep. 10, 2012

(65) Prior Publication Data

US 2013/0332843 A1    Dec. 12, 2013

Related U.S. Application Data

(60) Provisional application No. 61/696,076, filed on Aug. 31, 2012, provisional application No. 61/657,221, filed on Jun. 8, 2012.

(51) Int. Cl.
     *G06F 3/0481*      (2013.01)
(52) U.S. Cl.
     CPC .................... *G06F 3/0481* (2013.01)
(58) Field of Classification Search
     CPC ..................................................... G06F 3/0481
     USPC .......................................................... 715/744
     See application file for complete search history.

(56) References Cited

U.S. PATENT DOCUMENTS

| | | | |
|---|---|---|---|
| 5,483,261 | A | 1/1996 | Yasutake |
| 5,488,204 | A | 1/1996 | Mead et al. |
| 5,825,352 | A | 10/1998 | Bisset et al. |
| 5,835,079 | A | 11/1998 | Shieh |
| 5,880,411 | A | 3/1999 | Gillespie et al. |
| 6,188,391 | B1 | 2/2001 | Seely et al. |

(Continued)

FOREIGN PATENT DOCUMENTS

| | | |
|---|---|---|
| JP | 2000-163031 A | 6/2000 |
| JP | 2002-342033 A | 11/2002 |

OTHER PUBLICATIONS

PCWorld Staff, "f.lux at a Glance", Aug. 22, 2011, PCWorld.com, accessed from <http://www.pcworld.com/article/238611/flux.html>, pp. 1-4.*

(Continued)

*Primary Examiner* — Nicholas Klicos
(74) *Attorney, Agent, or Firm* — Kubota & Basol LLP

(57) ABSTRACT

Methods and systems for simulating light interaction and physical materials in a graphical user interface (GUI) of a resource-constrained device are provided. Simulating physical materials, such as glass and metal, in a GUI can allow a user to feel more natural in interacting with the GUI. The user experience can be further enhanced if the simulated physical materials in the GUI can interact with the device's environment in a manner similar to how the actual physical materials would interact. However, continually polling various sensors can be resource-intensive, especially for resource-constrained mobile devices. Accordingly, a mobile device can intelligently determine whether to begin a reduced detail mode, and then render user interface objects in the reduced detail mode to conserve resources.

25 Claims, 5 Drawing Sheets

(56) References Cited

U.S. PATENT DOCUMENTS

| | | | |
|---|---|---|---|
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,289,166 B2* | 10/2007 | Kimura | 348/730 |
| 7,663,607 B2 | 2/2010 | Hotelling et al. | |
| 7,692,629 B2* | 4/2010 | Baudisch et al. | 345/157 |
| 8,126,517 B2* | 2/2012 | Ashbrook et al. | 455/574 |
| 8,423,306 B2* | 4/2013 | Duncan et al. | 702/63 |
| 8,479,122 B2 | 7/2013 | Hotelling et al. | |
| 8,639,232 B2* | 1/2014 | Rabii | 455/418 |
| 8,665,214 B2* | 3/2014 | Forutanpour et al. | 345/158 |
| 8,949,070 B1* | 2/2015 | Kahn | G01C 22/006 |
| | | | 702/141 |
| 8,988,439 B1* | 3/2015 | Kahn | G09G 5/00 |
| | | | 345/156 |
| 9,063,574 B1* | 6/2015 | Ivanchenko | G06F 3/017 |
| 9,123,272 B1* | 9/2015 | Baldwin | G09G 3/003 |
| 2004/0034646 A1* | 2/2004 | Kimball et al. | 707/102 |
| 2005/0134525 A1* | 6/2005 | Tanghe et al. | 345/1.1 |
| 2005/0229200 A1* | 10/2005 | Kirkland et al. | 725/12 |
| 2006/0026521 A1 | 2/2006 | Hotelling et al. | |
| 2006/0164382 A1* | 7/2006 | Kulas et al. | 345/156 |
| 2006/0197753 A1 | 9/2006 | Hotelling | |
| 2007/0118813 A1* | 5/2007 | Forstall et al. | 715/805 |
| 2007/0139408 A1* | 6/2007 | Keranen | G06T 15/50 |
| | | | 345/426 |
| 2007/0147794 A1* | 6/2007 | Araki | 386/125 |
| 2007/0220291 A1* | 9/2007 | Stufflebeam | 713/320 |
| 2008/0057894 A1* | 3/2008 | Aleksic et al. | 455/187.1 |
| 2008/0074384 A1* | 3/2008 | Orr et al. | 345/156 |
| 2008/0211813 A1* | 9/2008 | Jamwal | G06T 15/60 |
| | | | 345/426 |
| 2009/0089706 A1* | 4/2009 | Furches et al. | 715/787 |
| 2009/0197635 A1* | 8/2009 | Kim et al. | 455/550.1 |
| 2009/0251460 A1* | 10/2009 | Dunnigan | G06T 15/50 |
| | | | 345/419 |
| 2009/0262074 A1* | 10/2009 | Nasiri et al. | 345/158 |
| 2009/0288022 A1* | 11/2009 | Almstrand | G06F 9/4443 |
| | | | 715/762 |
| 2009/0312101 A1* | 12/2009 | Pope | A63F 13/06 |
| | | | 463/36 |
| 2010/0033424 A1* | 2/2010 | Kabasawa et al. | 345/156 |
| 2010/0079426 A1* | 4/2010 | Pance | G06T 11/001 |
| | | | 345/207 |
| 2010/0103172 A1* | 4/2010 | Purdy, Sr. | G06T 15/50 |
| | | | 345/426 |
| 2010/0153313 A1* | 6/2010 | Baldwin et al. | 706/11 |
| 2010/0214216 A1* | 8/2010 | Nasiri et al. | 345/158 |
| 2010/0218024 A1* | 8/2010 | Yamamoto et al. | 713/324 |
| 2010/0220064 A1* | 9/2010 | Griffin et al. | 345/173 |
| 2010/0229124 A1* | 9/2010 | Green | G06F 3/0482 |
| | | | 715/828 |
| 2010/0277326 A1* | 11/2010 | Berk et al. | 340/636.11 |
| 2011/0013031 A1* | 1/2011 | Miyasako | 348/208.99 |
| 2011/0037777 A1* | 2/2011 | Lindahl | G06F 1/1626 |
| | | | 345/619 |
| 2011/0102455 A1* | 5/2011 | Temple | G06F 3/017 |
| | | | 345/619 |
| 2011/0109573 A1* | 5/2011 | Deslippe et al. | 345/173 |
| 2011/0115766 A1* | 5/2011 | Kerofsky et al. | 345/207 |
| 2011/0163968 A1* | 7/2011 | Hogan | 345/173 |
| 2011/0167369 A1* | 7/2011 | van Os | 715/769 |
| 2011/0202834 A1* | 8/2011 | Mandryk et al. | 715/701 |
| 2011/0221776 A1* | 9/2011 | Shimotani et al. | 345/647 |
| 2012/0032877 A1* | 2/2012 | Watkins, Jr. | G06F 1/1624 |
| | | | 345/156 |
| 2012/0036433 A1* | 2/2012 | Zimmer | G06T 15/20 |
| | | | 715/702 |
| 2012/0036485 A1* | 2/2012 | Watkins, Jr. | G06F 1/1626 |
| | | | 715/863 |
| 2012/0050310 A1* | 3/2012 | Patel et al. | 345/593 |
| 2012/0179325 A1* | 7/2012 | Faenger | B60K 35/00 |
| | | | 701/31.4 |
| 2012/0240042 A1* | 9/2012 | Migos et al. | 715/702 |
| 2012/0242676 A1* | 9/2012 | George | G09G 5/222 |
| | | | 345/589 |
| 2012/0306768 A1* | 12/2012 | Bailey | 345/173 |
| 2012/0317432 A1* | 12/2012 | Assad et al. | 713/340 |
| 2013/0009857 A1* | 1/2013 | Tchoukaleysky | G09G 3/3406 |
| | | | 345/102 |
| 2013/0035854 A1* | 2/2013 | Zhang | G01C 21/367 |
| | | | 701/455 |
| 2013/0067255 A1* | 3/2013 | Nikam | 713/320 |
| 2013/0120386 A1* | 5/2013 | Wilensky | G06F 3/0488 |
| | | | 345/426 |
| 2013/0152002 A1* | 6/2013 | Menczel et al. | 715/765 |
| 2013/0222273 A1* | 8/2013 | Tan | G06F 1/1626 |
| | | | 345/173 |
| 2013/0246967 A1* | 9/2013 | Wheeler | G06F 3/012 |
| | | | 715/784 |
| 2013/0254674 A1* | 9/2013 | Pekofsky | 715/744 |
| 2013/0262890 A1* | 10/2013 | Marshall et al. | 713/320 |

OTHER PUBLICATIONS

Jeremy Lesniak, "How To Optimize Remote Desktop in Windows 7", Aug. 25, 2011, Information Week, accessed from <http://www.informationweek.com/how-to-optimize-remote-desktop-in-windows-7/d/d-id/1099813?>, pp. 1-15.*

Lee, S.K. et al. (Apr. 1985). "A Multi-Touch Three Dimensional Touch-Sensitive Tablet," *Proceedings of CHI ' ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

SIMULATING PHYSICAL MATERIALS AND LIGHT INTERACTION IN A USER INTERFACE OF A RESOURCE-CONSTRAINED DEVICE

CROSS-REFERENCE TO RELATED APPLICATIONS

This application claims the benefit, under 35 U.S.C. § 119(e), of U.S. Provisional Patent Application Nos. 61/696,076, filed Aug. 31, 2012 and 61/657,221, filed Jun. 8, 2012, the contents of which are incorporated by reference herein in their entirety for all purposes.

FIELD OF THE DISCLOSURE

This relates generally to the simulation of physical materials and light interaction in a graphical user interface.

BACKGROUND OF THE DISCLOSURE

Mobile device applications often take advantage of various sensors in a mobile device for motion, orientation, and location information of the mobile device. For example, applications can use information from compasses, accelerometers, gyroscopes, and Global Positioning System (GPS) units to perform context-sensitive methods. Such sensors have also been used in game applications to allow users additional dimensions of input when controlling gameplay. However, continual polling of sensors can consume significant power, which can especially be a problem for mobile devices that run on battery power. Additionally, the rendering of graphics in response to sensor changes can be resource-intensive, which can tax the capabilities of a resource-constrained mobile device.

SUMMARY OF THE DISCLOSURE

This relates to simulating light interaction and physical materials in a graphical user interface (GUI) of a resource-constrained device, such as a mobile device. Simulating physical materials, such as glass and metal, in a GUI can allow a user to feel more natural in interacting with the GUI. Additionally, simulation of the same or similar materials as used to construct the exterior of the device can make the GUI feel more unified with the device as a whole. For example, a device with a brushed metal exterior can feel more unified to a user if the GUI features simulated brushed metal user interface objects.

The user experience can be further enhanced if the simulated physical materials in the GUI can interact with the device's environment in a manner similar to how the actual physical materials would interact. For example, a brushed metal device exterior can reflect light in a manner characteristic to that material. In the same way, light interaction can be simulated on a brushed metal user interface object. Mobile devices can have various sensors that can be used to obtain environmental information used in the simulation of such environment interaction. For example, a camera or optical proximity sensor can be used to obtain a direction and intensity of a light source. The light source direction and intensity can thereafter be used to simulate a light source shining on a brushed metal user interface object.

However, continually polling various sensors can be resource-intensive, especially for resource-constrained mobile devices. Accordingly, a mobile device can intelligently determine whether to begin a reduced detail mode, and then render user interface objects in the reduced detail mode to conserve resources. For example, if a battery life sensor indicates that a device is low on battery charge, then it can be determined to begin a reduced detail mode. In such a mode, rather than simulating light interaction based on position and intensity of actual light sources as sensed by a camera or optical proximity sensor, the light interaction can be simulated with a fixed light source and the direction changes of the light source can be calculated based on an orientation of the device as sensed by an accelerometer or a gyroscope. In addition, in some cases, the frame rate of the user interface object can be reduced or the rate at which the sensors are polled can be reduced.

DETAILED DESCRIPTION

Figure 1:
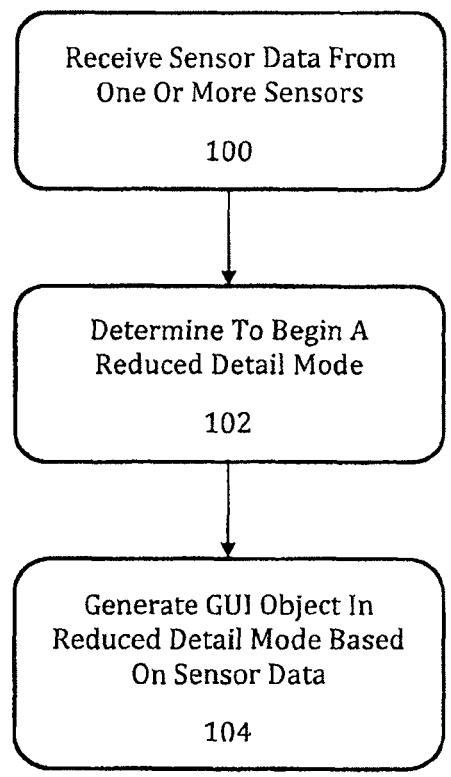
FIG. 1 illustrates an exemplary graphical user interface simulation method according to embodiments of the disclosure.

In the following description of embodiments, reference is made to the accompanying drawings which form a part hereof, and in which it is shown by way of illustration specific embodiments that can be practiced. It is to be understood that other embodiments can be used and structural changes can be made without departing from the scope of the disclosed embodiments.

Various embodiments relate to simulating light interaction and physical materials in a graphical user interface (GUI) of a resource-constrained device, such as a mobile device. Simulating physical materials, such as glass and metal, in a GUI can allow a user to feel more natural in interacting with the GUI. Additionally, simulation of the same or similar materials as used to construct the exterior of the device can make the GUI feel more unified with the device as a whole. For example, a device with a brushed metal exterior can feel more unified to a user if the GUI features simulated brushed metal user interface objects.

The user experience can be further enhanced if the simulated physical materials in the GUI can interact with the device's environment in a manner similar to how the actual physical materials would interact. For example, a brushed metal device exterior can reflect light in a manner characteristic to that material. In the same way, light interaction can be simulated on a brushed metal user interface object. Mobile devices can have various sensors that can be used to obtain environmental information used in the simulation of such environment interaction. For example, a camera or optical proximity sensor can be used to obtain a direction and intensity of a light source. The light source direction and intensity can thereafter be used to simulate a light source shining on a brushed metal user interface object.

However, continually polling various sensors can be resource-intensive, especially for resource-constrained mobile devices. Accordingly, a mobile device can intelligently determine whether to begin a reduced detail mode, and then render user interface objects in the reduced detail mode to conserve resources. For example, if a battery life sensor indicates that a device is low on battery charge, then it can be determined to begin a reduced detail mode. In such a mode, rather than simulating light interaction based on position and intensity of actual light sources as sensed by a camera or optical proximity sensor, the light interaction can be simulated with a fixed light source and the direction changes of the light source can be calculated based on an orientation of the device as sensed by an accelerometer or a gyroscope. In addition, in some cases, the frame rate of the user interface object can be reduced or the rate at which the sensors are polled can be reduced.

Although embodiments disclosed herein may be described and illustrated herein primarily in terms of a resource-constrained mobile device, it should be understood that the embodiments are not so limited, but are additionally applicable to any device with sensors and a graphical user interface.

FIG. 1 illustrates an exemplary GUI simulation method according to embodiments of the disclosure. At step 100, sensor data can be received from one or more sensors disposed within a mobile device. Sensors can include an accelerometer, a compass, and a gyroscope, which can sense motion and orientation information; a proximity sensor, a camera, and an ambient light sensor, which can sense light; a barometer, which can sense barometric pressure (which can also be an indicator of altitude); a thermometer, which can sense temperature, including ambient temperature and temperature of the device; a Global Positioning System (GPS) sensor, which can sense location; a touch sensor, which can sense locations of contacts on a touch-sensitive surface; and various system sensors which can sense remaining battery life, power consumption, processor speed, central processing unit (CPU) load and the like.

At step 102, it can be determined to begin a reduced detail mode by, for example, polling sensor data. For example, accelerometer and gyroscope sensor data can indicate motion of a device. If the sensor data indicates no motion or relatively little motion, then it may not be necessary to frequently update user interface objects that are rendered based on changes in motion data. Accordingly, it can be determined to begin a reduced detail mode. Additionally, if the sensor data indicates a large amount of motion of the device, then the user may not be able to perceive a high level of detail on user interface objects. In this case, too, it can be determined to begin a reduced detail mode. Accordingly, if motion data indicates a level of motion above or below a predetermined range, then it can be determined to begin a reduced detail mode.

In another example, if motion sensor data indicates that the device is being subjected to hard and jarring touches or handling, then the user may be annoyed and having trouble using the device. In such a case, a reduced detail mode may be appropriate to avoid distracting the user during operation and causing further annoyance.

In another example, touch sensor data can indicate locations of touches on a touch-screen. If the sensor data indicates that the touch-screen is being touched but no buttons are being pressed, then it may be inferred that the user is having trouble using the device. In such a case, a reduced detail mode may be appropriate again to avoid distracting the user during operation. Alternatively, the same sensor information may indicate that a user is touching the device but not looking at the device. In the same way, a reduced detail mode may be appropriate if the user is not looking at the device.

Additionally, system sensor information can be used to determine to begin a reduced detail mode. For example, a reduced detail mode may be appropriate if battery life is low, power usage is high, device temperature is high and/or if the CPU load is high.

Sensor data may indicate that one or more sensors are malfunctioning. In such a case, rendering user interface elements based on those sensors may be faulty, so a reduced detail mode may be appropriate wherein no sensor data is used or different sensor data is used. For example, if accelerometer data indicates the accelerometer is malfunctioning, then a gyroscope can be used for motion or orientation information. Alternatively, if one axis of a multi-axis accelerometer is stuck or otherwise malfunctioning, motion and orientation information can be approximated from the other functioning axes in a reduced detail mode.

The determination to begin the reduced detail mode can be based on non-sensor information. For example, if a display is active but the backlight of the display is turned off, then a user might not be able to perceive extra detail, so a reduced detail mode may be appropriate.

At step 104, at least one graphical user interface object may be generated in the reduced detail mode. In one example, generating a GUI object in the reduced detail mode can include approximating three-dimensional (3D) effects rather than fully rendering the 3D effects (e.g., with OpenGL®). For example, rather than fully rendering a 3D button in OpenGL, a pre-rendered button can be stored as an image file. Alternately, rather than rendering in OpenGL light sources reflecting on a metal knob, two-dimensional (2D) image layers can rotated, tilted, and blended to simulate changing light sources. In another example, generating a GUI object in the reduced detail mode can include using lower quality assets, such as lower resolution images, or images with reduced color depth. Alternatively, generating a GUI object in the reduced detail mode can include using less computationally intensive rendering algorithms, such as blending algorithms when alpha compositing user interface layers. Also, for the purposes of simulating physical materials and light interactions, generating a GUI object in the reduced detail mode can include using less accurate and less precise approximations of physics calculations, also resulting in less computationally intensive rendering algorithms. Generating a GUI object in the reduced detail mode can include reducing a frequency of polling sensors (e.g., an accelerometer) used in rendering the GUI object or reducing a frame rate of the display. Alternatively, generating a GUI object in the reduced detail mode can include, for example, using only one of an accelerometer and a gyroscope rather than both to determine motion or orientation. Additionally, if one or more axes of an accelerometer are malfunctioning, motion and/or orientation can be calculated based on the functioning axes of the accelerometer.

Generating a GUI object in the reduced detail mode may be based on a detail level. For example, when a detail level is high, a level of detail can be high: high quality assets can be used, a high frame rate can be used, a high frequency of polling sensors can be used, and the like. On the other hand, when a detail level is low, a level of detail can be low: low quality assets can be used, a low frame rate can be used, a low frequency of polling sensors can be used, and the like. In one example, a frame rate or a frequency of polling sensors can be calculated based on a detail level. In another example, a detail level may not be calculated and a frame rate or a frequency of polling sensors may be calculated based on sensor data, such as motion data.

The detail level may be determined based on sensor data. For example, as discussed above, a reduced detail mode may be appropriate in cases where the sensor data indicates a large amount of motion and in cases where the sensor data indicates no motion or relatively little motion. Accordingly, a detail level may be determined based on motion sensor data. The detail level can be determined based on a bell curve function of motion sensor data. For example, the detail level can be low when motion sensor data indicates little motion and when motion sensor data indicates a large amount of motion, whereas the detail level can be high when motion sensor data indicates a moderate amount of motion.

In one example, determining, based on sensor data, to begin a reduced detail mode can include determining a detail level based on sensor data. In another example, determining, based on sensor data, to begin a reduced detail mode can consist of determining a detail level based on sensor data.

A GUI object may be generated based on sensor data. For example, an angle, an intensity, and a color of simulated light reflected on a GUI object can be simulated based on motion and/or orientation data from an accelerometer and/or a gyroscope. Additionally, if a GUI object is rendered within an environment map, reflections from the environment map can change based on motion and/or orientation data.

An amount of simulated light sources and a position and color temperature of each of those light sources can be based on accelerometer data. Such parameters can be further based on an estimate of whether the user is inside or outside (in some cases based on light information from optical sensors), a time of day, and weather information. For example, if a GUI object is made out of specular metal, a user is outside, and the sky is clear at noon, the GUI object can be rendered based on one light source with a temperature of 12000K, intense reflections and highlights, and sharp drop-shadows. Additionally, the tint and color temperatures of simulated light sources can be based on a time of day.

A camera can be used to take an image of a current environment, and the image can be used for environment mapping of a GUI object.

The GUI can be filtered based on rotation and orientation information. For example, the GUI can be filtered to compensate for glare and unwanted color changes as a device is rotated. Additionally, the GUI can be filtered to adjust color to compensate for poor viewing angles.

In some examples, GUI objects can be generated so as to appear to rotate and pivot relative to the device based on rotation and orientation information. For example, as a device is rotated in one direction, a GUI object may appear to pivot in the opposite direction, as if its movement is independent relative to the movement of the physical device.

In one example, a GUI object may be generated based on non-sensor information. For example, a GUI object may be generated based on other user interface objects. Color of text, appearance of drop-shadows, contrast and brightness of user interface objects can be adjusted to conform with a selected wallpaper for the device, in one example. In other cases, the GUI object may be altered based on album art of currently playing music or other such content. Additionally, a GUI object may be generated based on physical properties of a device. For example, if a device is available in several colors, a GUI object may be generated based on a stored product identifier that indicates the color of the device. In such a case, a color or color scheme associated with the stored product identifier can be used when generating a GUI object, or coloring the tint of reflections in the GUI object, for example.

Simulated physical materials of GUI objects can appear to age over time. For example, simulated metal or glass may appear smudged or scratched based on a total use time of a device or an amount of time since release of a product.

Figure 2:
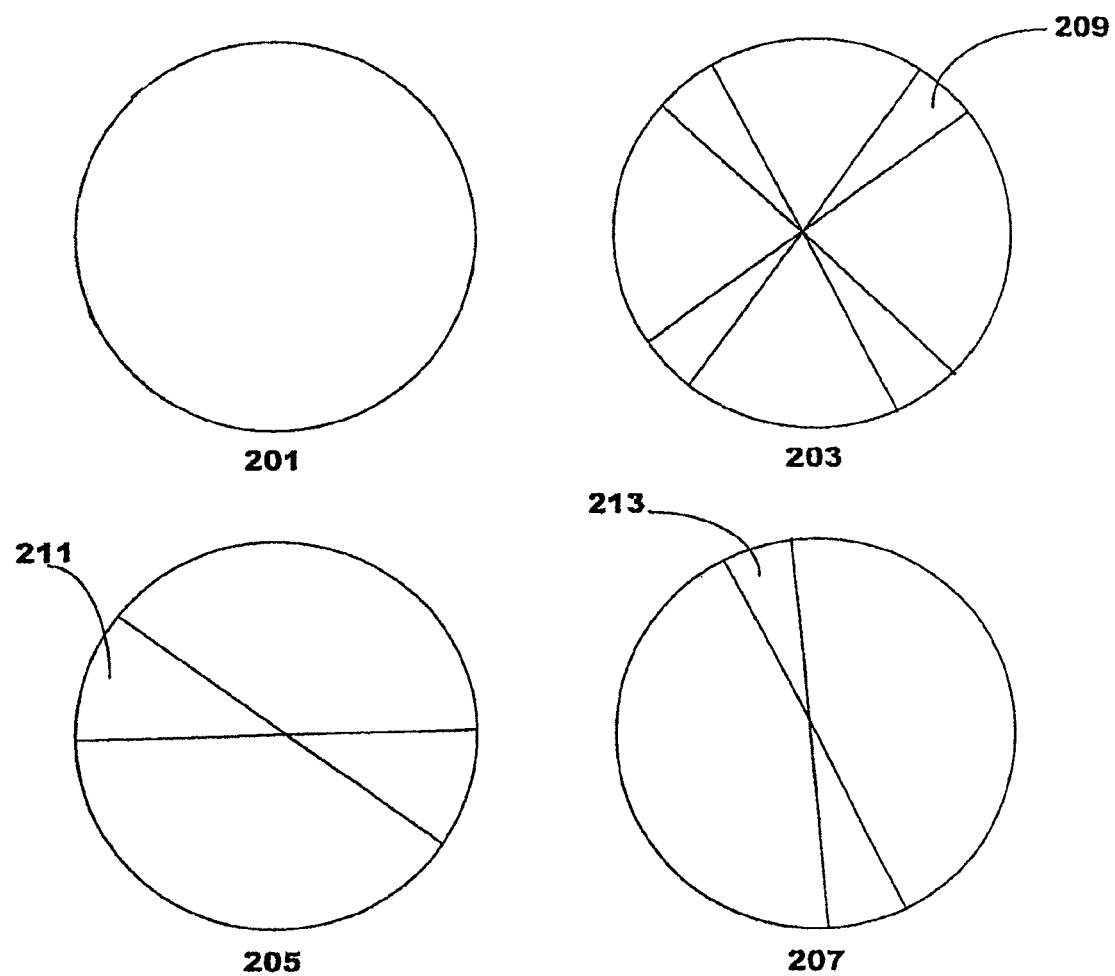
FIG. 2 illustrates exemplary layers of a graphical user interface object according to embodiments of the disclosure.

FIG. 2 illustrates exemplary layers 201, 203, 205 and 207 of a graphical user interface object. 3D rendering of a GUI object can be approximated by rotating and alpha compositing 2D layers. Metal layer 201 can have an appearance as a type of metal, such as a brushed metal, including texture and coloring of brushed metal. In this example, FIG. 2 illustrates layers of a brushed metal knob. Shadow layer 203 can be a mostly transparent layer, with two shadow axes 209. Each of the shadow axes 209 can be mostly black with increasing transparency further away from each axis. The two shadow axes 209 can be orthogonal to each other. A first light source layer 205 and a second light source layer 207 can be mostly transparent with light axes 211 and 213, respectively. Each light axis can be mostly white with increasing transparency further away from each axis. Light axes 211 and 213 can be different white colors. For example, light axis 211 can be pure white, and light axis 213 can be cool white with blue tints.

In one example, the four layers 201, 203, 205 and 207 can be alpha composited to form a brushed metal knob GUI object. The metal layer 201 can be a static layer beneath the other layers. A static layer can remain stationary on a display as sensor data changes. In contrast, shadow layer 203 and light source layers 205 and 207 can be dynamic layers, meaning they can be displayed differently based upon changing sensor data. For example, the alpha compositing transparency and the rotation of each dynamic layer can be changed depending on motion and orientation information received from an accelerometer and/or a gyroscope. The light source layers 205 and 207 can each be independently rotated as if it is a reflection of a different simulated light source pointed at the mobile device. Additionally, the shadow layer 203 can be rotated so that each shadow axis 209 bisects an angle between light source axis 211 and light source axis 213. By this process, light source reflections and shadows can be simulated on a brushed metal knob GUI object based on sensor data without performing a 3D rendering.

Although FIG. 2 illustrates four layers with three dynamic layers and one static layer, any number of layers can be possible, including one or two layers, and any number of dynamic and static layers.

Figure 3:
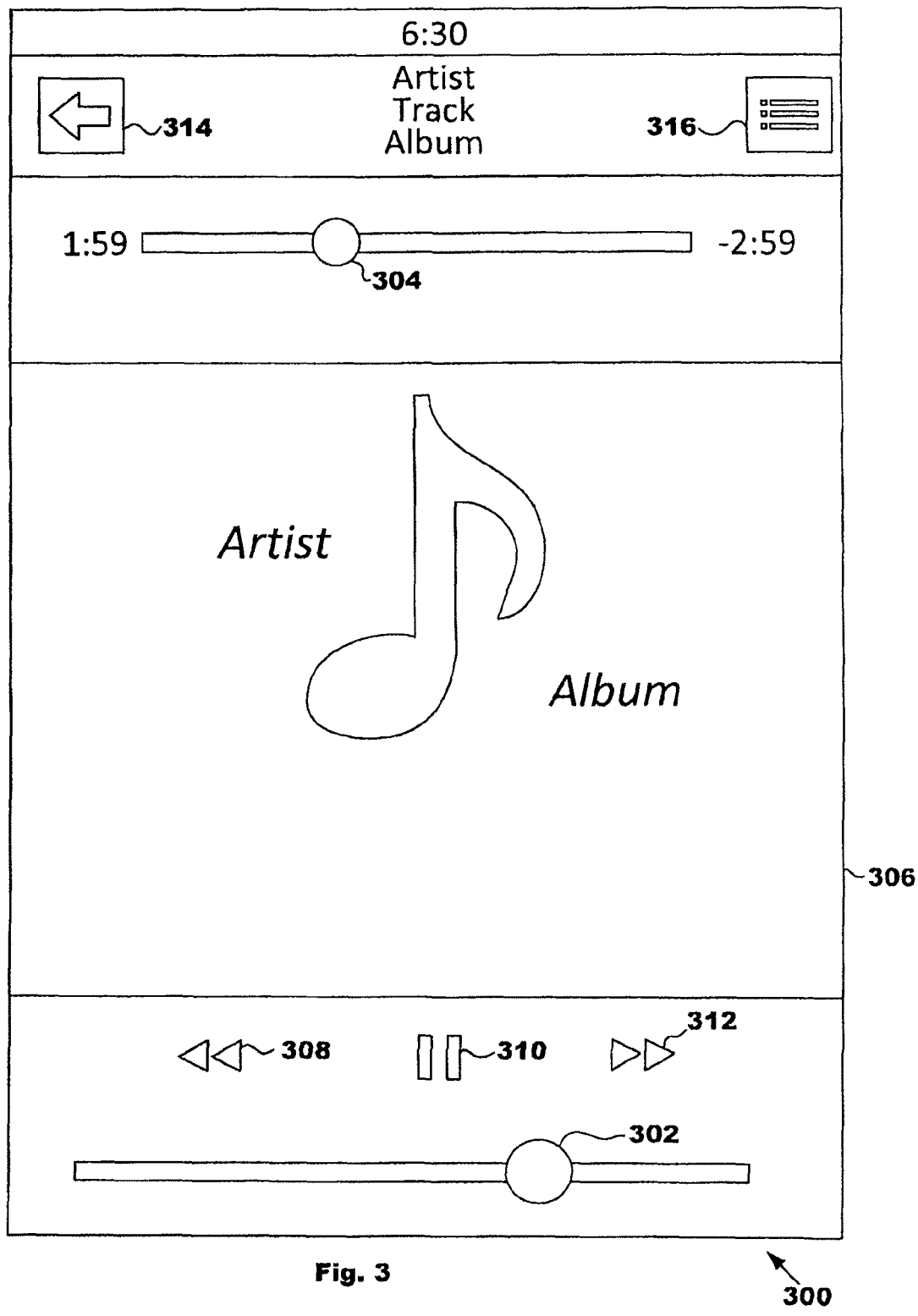
FIG. 3 illustrates a graphical user interface of a music app according to examples of the disclosure.

In some examples, one or more GUI objects may be designated as either fixed elements or floating elements. Floating elements may be generated based on sensor data, whereas fixed elements may not be generated based on sensor data. This can make the floating elements stand out to the user in contrast to the fixed elements. FIG. 3 illustrates a GUI 300 of a music app according to examples of the disclosure. In some examples, a volume knob 302, a navigation knob 304, and an album cover 306 can be designated as floating elements, whereas playback controls 308, 310, and 312, a back button 314, and a playlist button 316 can be designated as fixed elements. As floating elements, the volume knob 302 and the navigation knob 304 can be generated based on sensor data as discussed above in relation to FIG. 2. Additionally, as a floating element, the album cover 306 can be generated so as to appear to rotate and pivot relative to the device based on rotation and orientation information. The fixed elements, including playback controls 308, 310, and 312, the back button 314, and the playlist button 316, can be generated independent of sensor data such as rotation and orientation information.

In some examples, generating a floating element in a reduced detail mode can include generating the floating element as if it were a fixed element, or designating the floating element as a fixed element.

A GUI object may be generated based on the same sensor data used to determine to begin the reduced detail mode. For example, as discussed above, a GUI object may be generated in the reduced detail mode based on a detail level, which itself may be determined based on the sensor data used to determine to begin the reduced detail mode. However, a GUI object may instead be generated based on additional sensor data. Further, a GUI object may be generated based on both additional sensor data and the same sensor data used to determine to begin the reduced detail mode.

Figure 4:
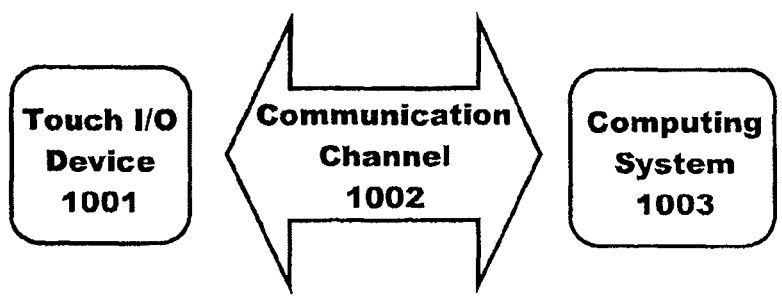
FIG. 4 illustrates a block diagram of an exemplary touch I/O device that can receive touch input for interacting with a computing system according to embodiments of the disclosure.

FIG. 4 illustrates a block diagram of an exemplary touch I/O device that can receive touch input for interacting with a computing system according to embodiments of the disclosure. Described embodiments may include touch I/O device 1001 that can receive touch input for interacting with computing system 1003 (FIG. 4) via wired or wireless communication channel 1002. Touch I/O device 1001 may be used to provide user input to computing system 1003 in lieu of or in combination with other input devices such as a keyboard, mouse, etc. One or more touch I/O devices 1001 may be used for providing user input to computing system 1003. Touch I/O device 1001 may be an integral part of computing system 1003 (e.g., touch screen on a laptop) or may be separate from computing system 1003.

Touch I/O device 1001 may include a touch sensitive panel which is wholly or partially transparent, semitransparent, non-transparent, opaque or any combination thereof. Touch I/O device 1001 may be embodied as a touch-sensitive keyboard, touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard) or any multi-dimensional object having a touch sensitive surface for receiving touch input.

In one example, touch I/O device 1001 embodied as a touch screen may include a transparent and/or semitransparent touch sensitive panel partially or wholly positioned over at least a portion of a display. In one example, touch I/O device 1001 functions to display graphical data transmitted from computing system 1003 (and/or another source) and also functions to receive user input. In another example, touch I/O device 1001 may be embodied as an integrated touch screen where touch sensitive components/devices are integral with display components/devices. In another example, a touch screen may be used as a supplemental or additional display screen for displaying supplemental or the same graphical data as a primary display and to receive touch input.

Touch I/O device 1001 may be configured to detect the location of one or more touches or near touches on device 1001 based on capacitive, resistive, optical, acoustic, inductive, mechanical, chemical measurements, or any phenomena that can be measured with respect to the occurrences of the one or more touches or near touches in proximity to deice 1001. Software, hardware, firmware or any combination thereof may be used to process the measurements of the detected touches to identify and track one or more gestures. A gesture may correspond to stationary or non-stationary, single or multiple, touches or near touches on touch I/O device 1001. A gesture may be performed by moving one or more fingers or other objects in a particular manner on touch I/O device 1001 such as tapping, pressing, rocking, scrubbing, twisting, changing orientation, pressing with varying pressure and the like at essentially the same time, contiguously, or consecutively. A gesture may be characterized by, but is not limited to a pinching, sliding, swiping, rotating, flexing, dragging, or tapping motion between or with any other finger or fingers. A single gesture may be performed with one or more hands, by one or more users, or any combination thereof.

Computing system 1003 may drive a display with graphical data to display a graphical user interface (GUI). The GUI may be configured to receive touch input via touch I/O device 1001. Embodied as a touch screen, touch I/O device 1001 may display the GUI. Alternatively, the GUI may be displayed on a display separate from touch I/O device 1001. The GUI may include graphical elements displayed at particular locations within the interface. Graphical elements may include but are not limited to a variety of displayed virtual input devices including virtual scroll wheels, a virtual keyboard, virtual knobs, virtual buttons, any virtual UI, and the like. A user may perform gestures at one or more particular locations on touch I/O device 1001 which may be associated with the graphical elements of the GUI. The user may perform gestures at one or more locations that are independent of the locations of graphical elements of the GUI. Gestures performed on touch I/O device 1001 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 1003 (e.g., affect a state or mode of a GUI, application, or operating system). Gestures may or may not be performed on touch I/O device 1001 in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In one example in which gestures are performed directly on a touch screen, a user may interact directly with objects on the touch screen, with or without a cursor or pointer being displayed on the touch screen.

Feedback may be provided to the user via communication channel 1002 in response to or based on the touch or near touches on touch I/O device 1001. Feedback may be transmitted optically, mechanically, electrically, olfactory, acoustically, or the like or any combination thereof and in a variable or non-variable manner.

Figure 5:
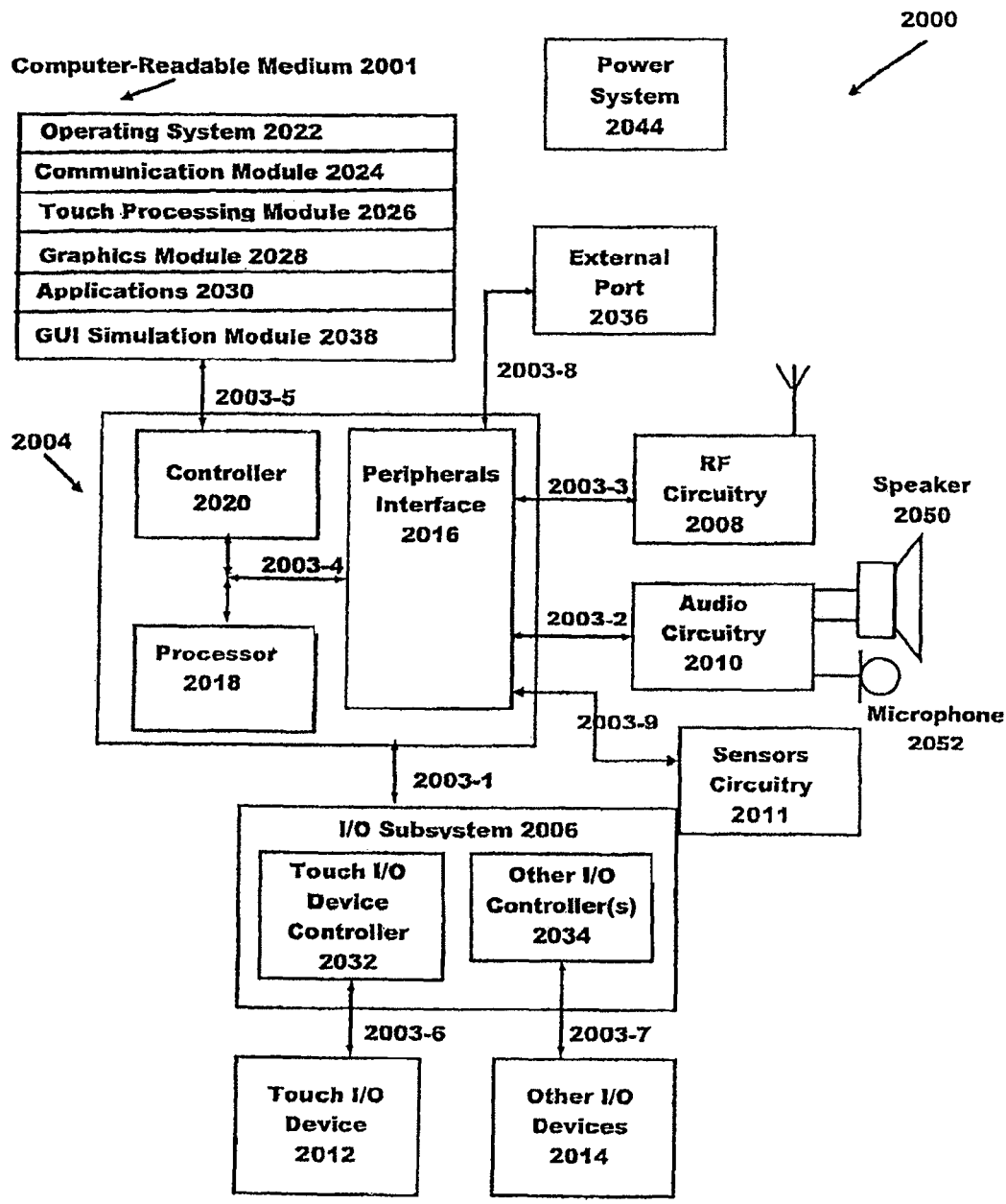
FIG. 5 illustrates a block diagram illustrating an exemplary device according to embodiments of the disclosure.

Attention is now directed towards a system architecture that may be embodied within any portable or non-portable device including but not limited to a communication device (e.g. mobile phone, smart phone), a multi-media device (e.g., MP3 player, TV, radio), a portable or handheld computer (e.g., tablet, netbook, laptop), a desktop computer, an All-In-One desktop, a peripheral device, or any other system or device adaptable to the inclusion of system architecture 2000, including combinations of two or more of these types of devices. FIG. 5 is a block diagram of system 2000 that generally includes one or more computer-readable media 2001, processing system 2004, Input/Output (I/O) subsystem 2006, radio frequency (RF) circuitry 2008, audio circuitry 2010, and sensor circuitry 2011 according to embodiments of the disclosure. These components may be coupled by one or more communication buses or signal lines 2003.

It should be apparent that the architecture shown in FIG. 5 is only one example architecture of system 2000, and that system 2000 could have more or fewer components than shown, or a different configuration of components. The various components shown in FIG. 5 can be implemented in hardware, software, firmware or any combination thereof, including one or more signal processing and/or application specific integrated circuits.

RF circuitry 2008 is used to send and receive information over a wireless link or network to one or more other devices and includes well-known circuitry for performing this function. RF circuitry 2008 and audio circuitry 2010 are coupled to processing system 2004 via peripherals interface 2016. Interface 2016 includes various known components for establishing and maintaining communication between peripherals and processing system 2004. Audio circuitry 2010 is coupled to audio speaker 2050 and microphone 2052 and includes known circuitry for processing voice signals received from interface 2016 to enable a user to communicate in real-time with other users. Audio circuitry 2010 can include a headphone jack (not shown). Sensor circuitry 2011 can be coupled to various sensors including, but not limited to, an accelerometer, a gyroscope, a barometer, a compass, a proximity sensor, a camera, an ambient light sensor, a thermometer, a GPS sensor, and various system sensors which can sense remaining battery life, power consumption, processor speed, CPU load, and the like.

Peripherals interface 2016 couples the input and output peripherals of the system to processor 2018 and non-transitory computer-readable storage medium 2001. One or more processors 2018 communicate with one or more computer-readable mediums 2001 via controller 2020. Non-transitory computer-readable storage medium 2001 can be any device or medium that can store code and/or data for use by one or more processors 2018. Medium 2001 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 2001 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processors 2018 run various software components stored in medium 2001 to perform various functions for system 2000. The software components can include operating system 2022, communication module (or set of instructions) 2024, touch processing module (or set of instructions) 2026, graphics module (or set of instructions) 2028, one or more applications (or set of instructions) 2030, and GUI simulation module (or set of instructions) 2038. Each of these modules and above noted applications correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. Medium 2001 may store a subset of the modules and data structures identified above. Furthermore, medium 2001 may store additional modules and data structures not described above.

Operating system 2022 includes various procedures, sets of instructions, software components and/or drivers for controlling and managing general system tasks (e.g., memory management, storage device control, power management, etc.) and facilitates communication between various hardware and software components.

Communication module 2024 facilitates communication with other devices over one or more external ports 2036 or via RF circuitry 2008 and includes various software components for handling data received from RF circuitry 2008 and/or external port 2036.

Graphics module 2028 includes various known software components for rendering, animating and displaying graphical objects on a display surface. In one example in which touch I/O device 2012 is a touch sensitive display (e.g., touch screen) graphics module 2028 can include components for rendering, displaying, and animating objects on the touch sensitive display.

One or more applications 2030 can include any applications installed on system 2000, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player, etc.

Touch processing module 2026 includes various software components for performing various tasks associated with touch I/O device 2012 including but not limited to receiving and processing touch input received from I/O device 2012 via touch I/O device controller 2032.

System 2000 may further include GUI simulation module 2038 for performing the method/functions as described herein in connection with FIG. 1. GUI simulation module 2038 may at least function to generate GUI objects on a display through graphics module 2028 and receive sensor information from sensors circuitry 2011. Module 2038 may be embodied as hardware, software, firmware, or any combination thereof. Although module 2038 is shown to reside within medium 2001, all or portions of module 2038 may be embodied within other components within system 2000 or may be wholly embodied as a separate component within system 2000.

I/O subsystem 2006 is coupled to touch I/O device 2012 and one or more other I/O devices 2014 for controlling or performing various functions. Touch I/O device 2012 communicates with processing system 2004 via touch I/O device controller 2032, which includes various components for processing user touch input (e.g., scanning hardware). One or more other input controllers 2034 receives/sends electrical signals from/to other I/O devices 2014. Other I/O devices 2014 may include physical buttons, dials, slider switches, sticks, keyboards, touch pads, additional display screens, or any combination thereof.

If embodied as a touch screen, touch I/O device 2012 displays visual output to the user in a GUI. The visual output may include text, graphics, video, and any combination thereof. Some or all of the visual output may correspond to user-interface objects. One such user-interface object may be a touch-sensitive keyboard. Touch I/O device 2012 forms a touch-sensitive surface that accepts touch input from the user. Touch I/O device 2012 and touch screen controller 2032 (along with any associated modules and/or sets of instructions in medium 2001) detects and tracks touches or near touches (and any movement or release of the touch) on touch I/O device 2012 and converts the detected touch input into interaction with graphical objects, such as one or more user-interface objects. In the case in which device 2012 is embodied as a touch screen, the user can directly interact with graphical objects that are displayed on the touch screen. Alternatively, in the case in which device 2012 is embodied as a touch device other than a touch screen (e.g., a touch pad), the user may indirectly interact with graphical objects that are displayed on a separate display screen embodied as I/O device 2014.

Touch I/O device 2012 may be analogous to the multi-touch sensitive surface described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety for all purposes.

In one example in which touch I/O device 2012 is a touch screen, the touch screen may use LCD (liquid crystal display) technology, LPD (light emitting polymer display) technology, OLED (organic LED), or OEL (organic electro luminescence), although other display technologies may be used.

Feedback may be provided by touch I/O device 2012 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 2000 also includes power system 2044 for powering the various hardware components and may include a power management system, one or more power sources, a recharging system, a power failure detection circuit, a power converter or inverter, a power status indicator and any other components typically associated with the generation, management and distribution of power in portable devices.

In one example, peripherals interface 2016, one or more processors 2018, and memory controller 2020 may be implemented on a single chip, such as processing system 2004. In another example, they may be implemented on separate chips.

In some examples, a computer-implemented graphical user interface method is disclosed. The method can include receiving sensor data from one or more sensors disposed within a mobile device; determining, based on the sensor data, to begin a reduced detail mode; and generating at least one graphical user interface object in the reduced detail mode, wherein the at least one graphical user interface object can be generated based on additional sensor data. Additionally or alternatively to one or more of the examples disclosed above, generating the at least one graphical user interface object can include simulating light interaction with the at least one graphical user interface object based on the additional sensor data. Additionally or alternatively to one or more of the examples disclosed above, simulating light interaction based on the additional sensor data can include simulating light interaction based on one or both of motion and orientation data. Additionally or alternatively to one or more of the examples disclosed above, simulating light interaction can include alpha compositing one or more light source layers, and wherein the one or more light source layers can change based on one or both of motion and orientation data. Additionally or alternatively to one or more of the examples disclosed above, the determining can be based on motion data. Additionally or alternatively to one or more of the examples disclosed above, the determining can include determining a motion value based on the motion data and determining that the motion value is outside a predetermined range. Additionally or alternatively to one or more of the examples disclosed above, generating the at least one graphical user interface object in the reduced detail mode can include selecting, from a set of at least first and second assets, the first asset, wherein the first asset can be of lower quality than the second asset. Additionally or alternatively to one or more of the examples disclosed above, generating the at least one graphical user interface object in the reduced detail mode can include selecting, from a set of at least first and second rendering algorithms, a first rendering algorithm, wherein the first rendering algorithm can be less computationally intensive than the second rendering algorithm. Additionally or alternatively to one or more of the examples disclosed above, the first rendering algorithm can include selecting a pre-rendered asset and the second rendering algorithm can include rendering a three-dimensional asset. Additionally or alternatively to one or more of the examples disclosed above, generating the at least one graphical user interface object in the reduced detail mode can include reducing one or both of a frequency of polling sensors and a frame rate. Additionally or alternatively to one or more of the examples disclosed above, generating the at least one graphical user interface object in the reduced detail mode can include generating the at least one graphical user interface object based on a detail level. Additionally or alternatively to one or more of the examples disclosed above, the method can further include determining the detail level based on a bell curve function of motion data.

In some examples, a mobile device is disclosed. The mobile device can include one or more processors; a memory; one or more sensors; and one or more programs stored in the memory, wherein the one or more programs are configured to be executed by the one or more processors, the one or more programs including instructions for: receiving sensor data from the one or more sensors; determining, based on the sensor data, to begin a reduced detail mode; and generating at least one graphical user interface object in the reduced detail mode, wherein the at least one graphical user interface object can be generated based on additional sensor data.

Although the disclosed embodiments have been fully described with reference to the accompanying drawings, it is to be noted that various changes and modifications will become apparent to those skilled in the art. Such changes and modifications are to be understood as being included within the scope of the disclosed embodiments as defined by the appended claims.

What is claimed is:

1. A computer-implemented graphical user interface method, comprising:
   at an electronic device with a display and one or more sensors:
   displaying, on the display, a user interface object;
   while displaying the user interface object, detecting, via the one or more sensors, motion of the device; and in response to detecting the motion of the device, updating an appearance of the user interface object based on a lighting effect that changes an appearance of the user interface object responsive to motion of the device, including:

in accordance with a determination that the motion has a magnitude above a first threshold, updating the appearance of the user interface object with a first detail level that specifies a responsiveness of the lighting effect on the appearance of the user interface object to motion of the device; and in accordance with a determination that the motion has a magnitude-below the first threshold, updating the appearance of the user interface object with a second detail level, different from the first detail level, that specifies a responsiveness of the lighting effect on the appearance of the user interface object to motion of the device.

2. The method of claim 1, wherein updating the appearance of the user interface object based on the lighting effect includes simulating light interaction with the user interface object.

3. The method of claim 2, wherein simulating light interaction includes detecting, via the one or more sensors, an orientation of the device and simulating light interaction based on one or both of the detected motion of the device and the orientation of the device.

4. The method of claim 2, wherein simulating light interaction includes detecting, via the one or more sensors, an orientation of the device and alpha compositing one or more light source layers, and wherein the one or more light source layers change based on one or both of the detected motion of the device and the orientation of the device.

5. The method of claim 2, wherein simulating light interaction with the user interface object includes estimating a position of or an orientation of a light source.

6. The method of claim 2, wherein simulating light interaction comprises a first quality of lighting simulation in accordance with the first detail level and a second quality of lighting simulation in accordance with the second detail level, the first quality of lighting simulation different than the second quality of lighting simulation.

7. The method of claim 1, wherein updating the appearance of the user interface object with the second detail level is further in accordance with a determination that the motion also has a magnitude above a second threshold lower than the first threshold; and wherein updating the appearance of the user interface object further includes:

in accordance with a determination that the motion of the device has a magnitude below the second threshold, updating the appearance of the user interface object with the first detail level.

8. The method of claim 1, wherein updating the appearance of the user interface object with the first detail level includes selecting, from a set of at least a first asset and a second asset, the first asset, wherein the first asset is of lower quality than the second asset.

9. The method of claim 1, wherein updating the appearance of the user interface object with the first detail level includes selecting, from a set of at least a first rendering algorithm and a second rendering algorithm, the first rendering algorithm, wherein the first rendering algorithm is less computationally intensive than the second rendering algorithm.

10. The method of claim 9, wherein the first rendering algorithm includes selecting a pre-rendered asset and the second rendering algorithm includes rendering a three-dimensional asset.

11. The method of claim 1, wherein updating the appearance of the user interface object with the first detail level includes reducing one or both of a frequency of polling the one or more sensors and a frame rate.

12. The method of claim 1, further comprising:

determining a sampling rate of at least one of the one or more sensors, wherein the sampling rate of the at least one of the one or more sensors is a first sampling rate in accordance with the first detail level and the sampling rate of the at least one of the one or more sensors is a second sampling rate, different than the first sampling rate, in accordance with the second detail level.

13. The method of claim 1, wherein updating the appearance of the user interface object based on the lighting effect does not change the size of the user interface object displayed on the display of the device.

14. The method of claim 1, wherein the user interface object displayed on the display of the electronic device comprises a virtual input device.

15. A non-transitory computer readable storage medium having stored therein instructions, which when executed by a mobile device having a display and one or more sensors, cause the device to perform a method comprising:

displaying, on the display, a user interface object;

while displaying the user interface object, detecting, via the one or more sensors, motion of the device; and in response to detecting the motion of the device, updating an appearance of the user interface object based on a lighting effect that changes an appearance of the user interface object responsive to motion of the device, including:

in accordance with a determination that the motion has a magnitude above a first threshold, updating the appearance of the user interface object with a first detail level that specifies a responsiveness of the lighting effect on the appearance of the user interface object to motion of the device; and in accordance with a determination that the motion has a magnitude below the first threshold, updating the appearance of the user interface object with a second detail level, different from the first detail level, that specifies a responsiveness of the lighting effect on the appearance of the user interface object to motion of the device.

16. The non-transitory computer readable storage medium of claim 15, wherein updating the appearance of the user interface object based on the lighting effect includes simulating light interaction with the user interface object.

17. The non-transitory computer readable storage medium of claim 16, wherein simulating light interaction includes detecting, via the one or more sensors, an orientation of the device and simulating light interaction based on one or both of the detected motion of the device and the orientation of the device.

18. The non-transitory computer readable storage medium of claim 16, wherein simulating light interaction includes detecting, via the one or more sensors, an orientation of the device and alpha compositing one or more light source layers, and wherein the one or more light source layers change based on one or both of the detected motion of the device and the orientation of the device.

19. The non-transitory computer readable storage medium of claim 16, wherein simulating light interaction with the user interface object includes estimating a position of or an orientation of a light source.

20. The non-transitory computer readable storage medium of claim 15,
wherein updating the appearance of the user interface object with the second detail level is further in accordance with a determination that the motion also has a magnitude above a second threshold lower than the first threshold; and wherein updating the appearance of the user interface object further includes:
in accordance with a determination that the motion of the device has a magnitude below the second threshold, updating the appearance of the user interface object with the first detail level.

21. The non-transitory computer readable storage medium of claim 15, wherein updating the appearance of the user interface object with the first detail level includes selecting, from a set of at least a first asset and a second asset, the first asset, wherein the first asset is of lower quality than the second asset.

22. The non-transitory computer readable storage medium of claim 15, wherein updating the appearance of the user interface object with the first detail level includes selecting, from a set of at least a first rendering algorithm and a second rendering algorithm, the first rendering algorithm, wherein the first rendering algorithm is less computationally intensive than the second rendering algorithm.

23. The non-transitory computer readable storage medium of claim 22, wherein the first rendering algorithm includes selecting a pre-rendered asset and the second rendering algorithm includes rendering a three-dimensional asset.

24. The non-transitory computer readable storage medium of claim 15, wherein updating the appearance of the user interface object with the first detail level includes reducing one or both of a frequency of polling the one or more sensors and a frame rate.

25. A mobile device, comprising:
one or more processors;
a memory;
a display;
one or more sensors; and
one or more programs stored in the memory, wherein the one or more programs are configured to be executed by the one or more processors, the one or more programs including instructions for:
displaying, on the display, a user interface object;
while displaying the user interface object, detecting, via the one or more sensors, motion of the device; and
in response to detecting the motion of the device, updating an appearance of the user interface object based on a lighting effect that changes an appearance of the user interface object responsive to motion of the device, including:
in accordance with a determination that the motion has a magnitude above a first threshold, updating the appearance of the user interface object with a first detail level that specifies a responsiveness of the lighting effect on the appearance of the user interface object to motion of the device; and
in accordance with a determination that the motion of the device has a magnitude below the first threshold, updating the appearance of the user interface object with a second detail level, different from the first detail level, that specifies a responsiveness of the lighting effect on the appearance of the user interface object to motion of the device.

* * * * *